United States Patent
D'Agostini et al.

(10) Patent No.: US 10,393,373 B2
(45) Date of Patent: Aug. 27, 2019

(54) OXYGEN-FUEL BURNER WITH CAVITY-ACTUATED MIXING

(71) Applicant: Air Products and Chemicals, Inc., Allentown, PA (US)

(72) Inventors: Mark Daniel D'Agostini, Allentown, PA (US); Anup Vasant Sane, Allentown, PA (US); Avishek Guha, Breinigsville, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 15/320,601

(22) PCT Filed: Jun. 23, 2015

(86) PCT No.: PCT/US2015/037224
§ 371 (c)(1),
(2) Date: Dec. 20, 2016

(87) PCT Pub. No.: WO2015/200347
PCT Pub. Date: Dec. 30, 2015

(65) Prior Publication Data
US 2017/0198905 A1    Jul. 13, 2017

Related U.S. Application Data

(60) Provisional application No. 62/015,792, filed on Jun. 23, 2014.

(51) Int. Cl.
*F23D 14/32* (2006.01)
*F23L 7/00* (2006.01)
(Continued)

(52) U.S. Cl.
CPC .............. *F23D 14/32* (2013.01); *F23C 6/045* (2013.01); *F23D 1/00* (2013.01); *F23D 14/22* (2013.01);
(Continued)

(58) Field of Classification Search
CPC . F23D 14/32; F23D 14/22; F23D 1/00; F23D 14/24; F23L 7/007; F23C 6/045
(Continued)

(56) References Cited

U.S. PATENT DOCUMENTS 4,378,205 A * 3/1983 Anderson ............. C03B 5/2353
                                                              431/187
5,299,512 A    4/1994 Olsen
(Continued)

FOREIGN PATENT DOCUMENTS

CN    101169243 A    4/2008    ............... F23D 1/00
CN    101205866 A    6/2008    ........... F02N 17/053
(Continued)

OTHER PUBLICATIONS

European International Search Report and Written Opinion of the International Searching Authority, dated Nov. 13, 2015, for PCT/US2015/037224.

*Primary Examiner* — Avinash A Savani
*Assistant Examiner* — Rabeeul I Zuberi
(74) *Attorney, Agent, or Firm* — Larry S. Zelson

(57) ABSTRACT

An oxy-gaseous fuel burner (400, 500) or a solid fuel burner (700) having an annular cavity (404, 504, 704) upstream from and proximate to an outlet plane (416, 516, 716) and a converging (434, 734) or converging-diverging nozzle (537) located upstream from and proximal to the cavity (404, 504, 704). The solid fuel burner (700) also is prefer-
(Continued)

ably operated so that the velocity of gas exiting a second annulus (730) is less than the velocity of gas exiting a central conduit (710).

19 Claims, 13 Drawing Sheets

(51) Int. Cl.
    *F23D 14/22*     (2006.01)
    *F23C 6/04*     (2006.01)
    *F23D 1/00*     (2006.01)
    *F23D 14/24*     (2006.01)

(52) U.S. Cl.
    CPC .............. *F23D 14/24* (2013.01); *F23L 7/007* (2013.01); *F23C 2201/20* (2013.01); *Y02E 20/344* (2013.01)

(58) Field of Classification Search
    USPC ............ 431/8, 10, 5, 9; 138/37, 39, 44
    See application file for complete search history.

(56) References Cited

U.S. PATENT DOCUMENTS

| | | | |
|---|---|---|---|
| 5,743,723 A | 4/1998 | Pavlicevic et al. | F23M 3/04 |
| 5,904,895 A | 5/1999 | Gitman et al. | |
| 6,096,261 A | 8/2000 | Anderson et al. | |
| 6,322,610 B1 | 11/2001 | Pavlicevic et al. | G21C 5/32 |
| 2003/0104328 A1 | 6/2003 | Kobayashi et al. | |
| 2003/0143502 A1* | 7/2003 | Heier | F23C 5/32 431/8 |
| 2007/0057417 A1 | 3/2007 | Strelbisky et al. | |
| 2008/0184919 A1* | 8/2008 | D'Agostini | F23C 6/045 110/263 |
| 2010/0077944 A1* | 4/2010 | Slavejkov | F23C 6/04 110/345 |
| 2012/0216504 A1* | 8/2012 | Snyder | F23M 9/06 60/39.76 |
| 2012/0222592 A1 | 9/2012 | Boer et al. | |
| 2015/0247673 A1* | 9/2015 | Sane | F23N 1/02 266/44 |

FOREIGN PATENT DOCUMENTS

| | | | |
|---|---|---|---|
| CN | 103032898 | 4/2013 | |
| CN | 103032898 A | 4/2013 | ............... F23R 3/28 |
| EP | 0763692 | 3/1997 | |
| EP | 1936270 A2 | 6/2008 | |
| JP | 2003-240227 A | 8/2003 | |
| WO | 0028097 A1 | 5/2000 | |

* cited by examiner

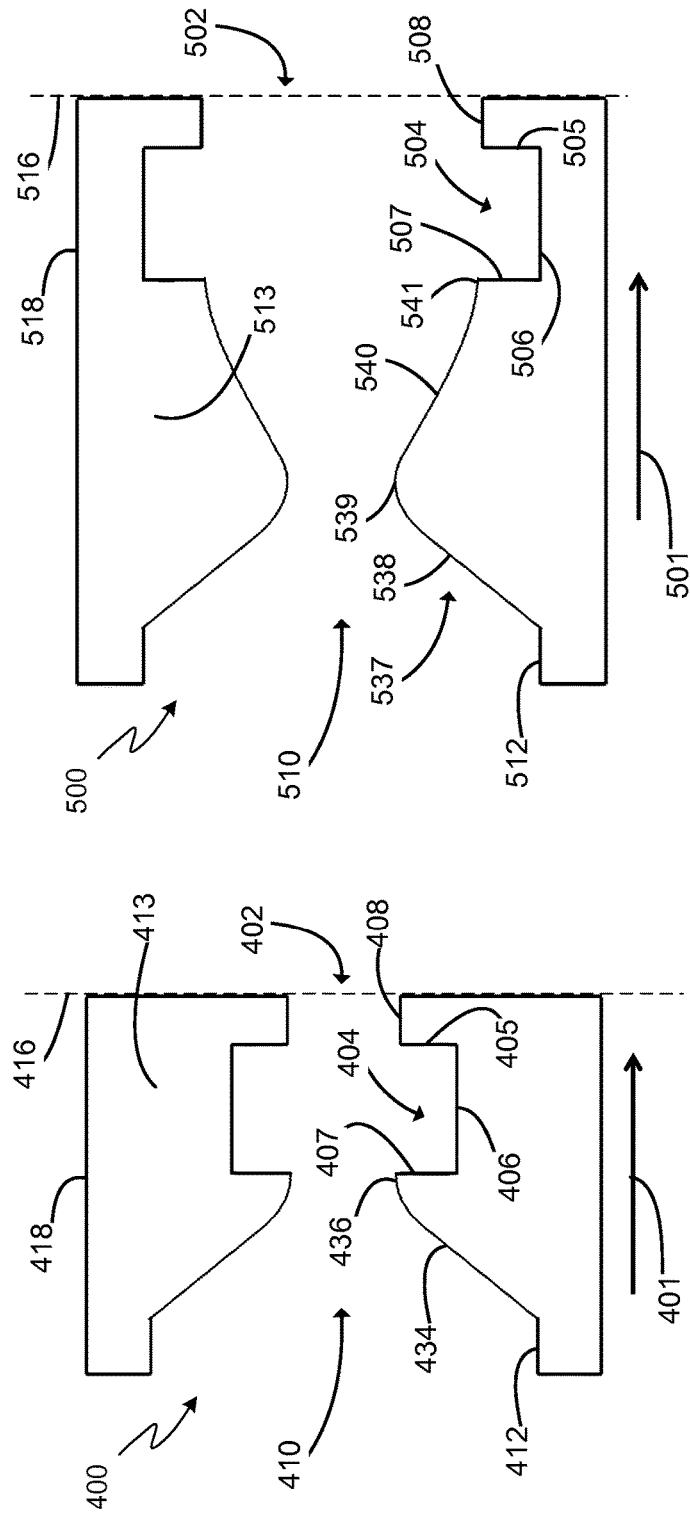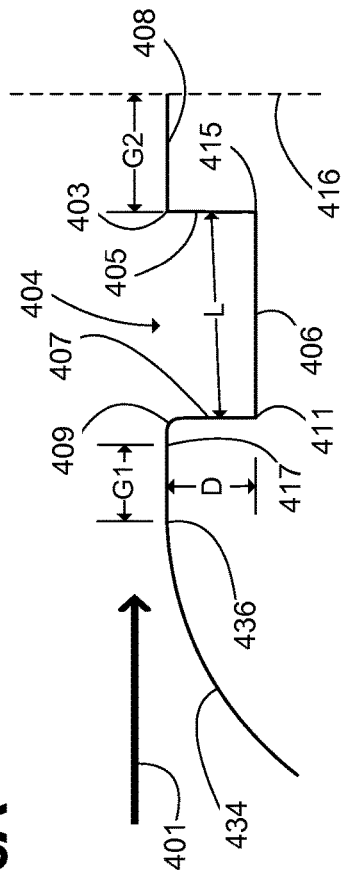
Figure 6A
Figure 6B
Figure 7

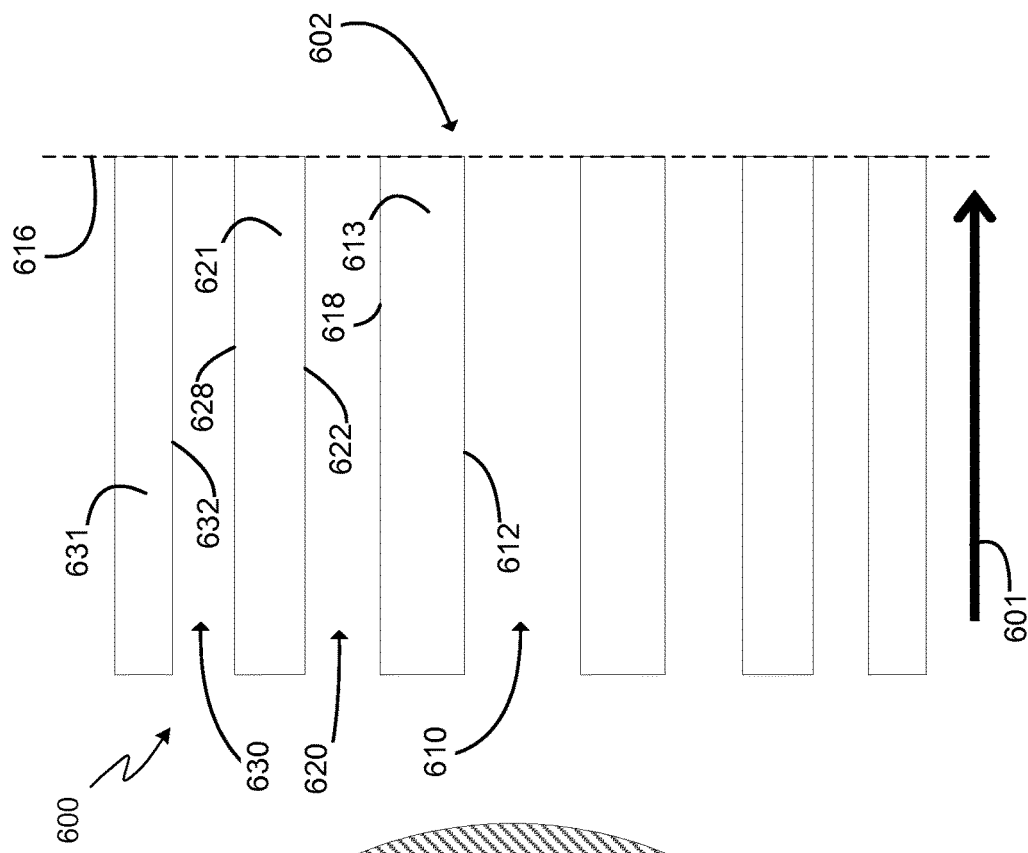
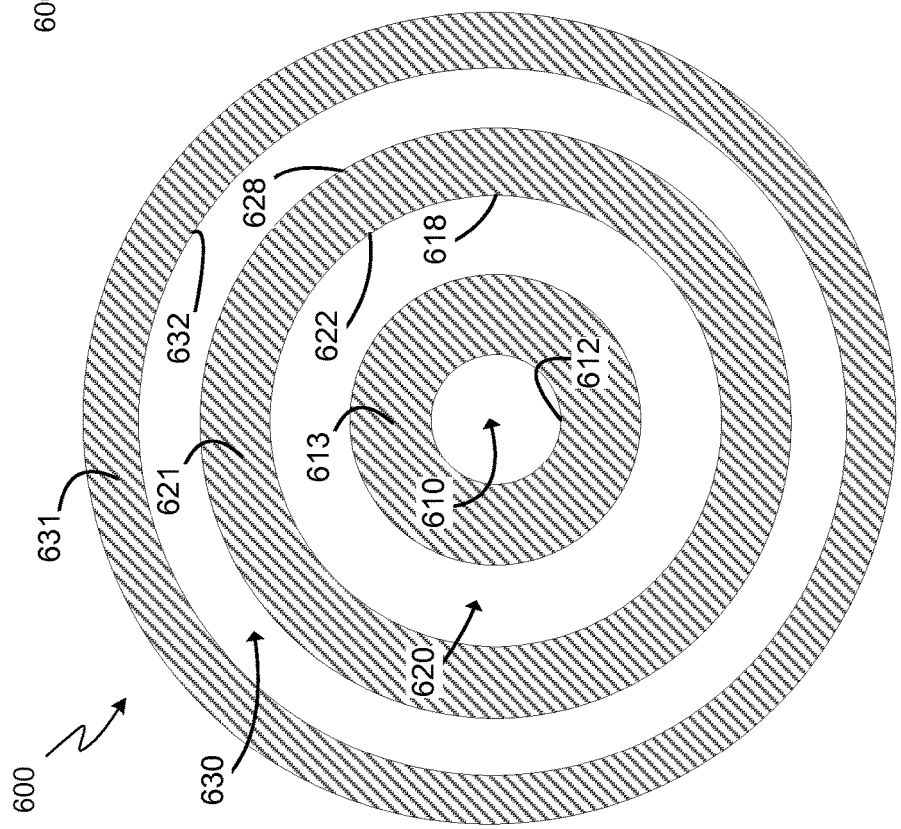

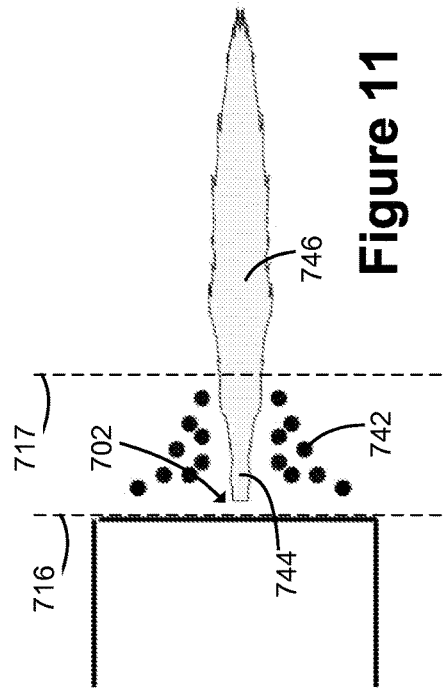
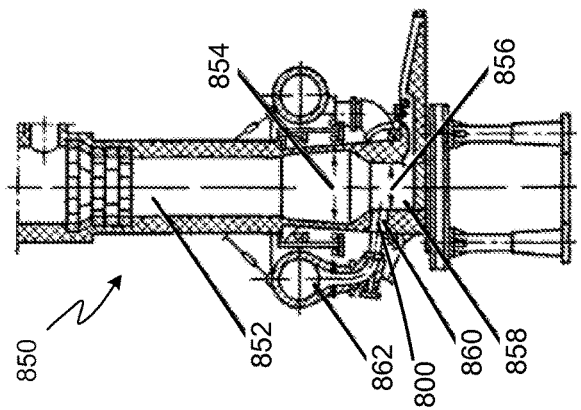
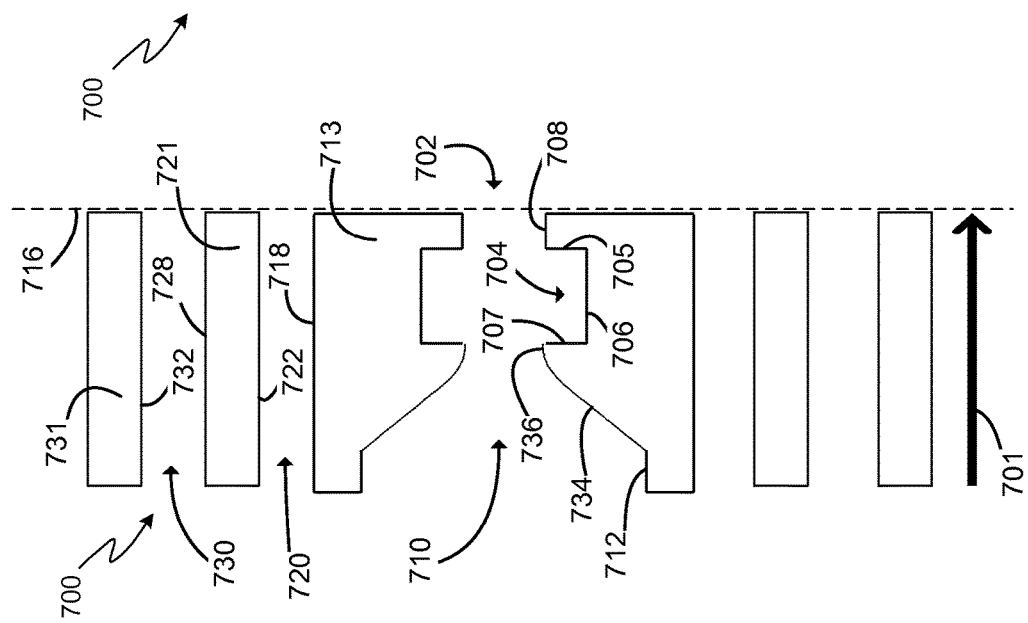

OXYGEN-FUEL BURNER WITH CAVITY-ACTUATED MIXING

CROSS REFERENCE TO RELATED APPLICATION(S)

This application claims the benefit of U.S. Provisional Patent Application Ser. No. 62/015,792, filed Jun. 23, 2014, which is incorporated by reference as if fully set forth.

BACKGROUND

The use of oxygen in combustion systems is well known in the art as an effective technique for accelerating the rate of combustion reactions versus that which naturally occurs in air-fuel combustion. Some combustion systems and applications are constrained by such stringent limitations on the time and/or space available for combustion that the use of oxygen-alone (apart from the application of special devices and/or techniques) may not be sufficient to overcome such limitations. For example, in applications in which extremely high speed diffusion (i.e., non-premixed) flames of oxygen and a gaseous fuel are used, the rate of mixing of the two reactant species can be the "rate-limiting" step preventing complete and/or stable combustion. In this case, enhancement of the reactant mixing rate is needed to adequately "feed" the oxygen-fuel reactions.

Another challenging application is the combustion of solid fuel, particularly those solid fuels having extremely low volatile matter, such as anthracite coal and most cokes. Yet another challenging application in the combustion of solid fuel is when the solid fuel must be combusted while undergoing high speed movement and, further, when the same combustion must be completed over a very short reaction distance, such as often occurs with high speed injection of solid fuels into a bed of raw material; for example in an iron-forming cupola or steel-forming blast furnace process.

In some prior art applications, solid fuel is transported in flows with velocities that exceed about 100 m/sec. Such high speed flows generally require exceedingly high transport gas pressures resulting in a very high cost and power requirement, and moreover resulting in very rapid erosion of the walls of the transport passages. Moreover, when the high speed solid fuel is discharged from the transport passage into the combustion space, due to its high momentum, the solid fuel would resist entrainment into even a high speed oxy-gas flame, and would thus fail to adequately heat-up, ignite, and combust as needed within the allowable time and over the allowable distance.

There have been attempts to use cavity-actuated mixing of shear layers to increase combustion rates in high speed flows. In one such prior art system a cavity is placed downstream of the location of initial fuel and oxidizer mixing (the oxidizer being air). In another prior art system, fuel is injected into an air stream upstream from a cavity. Although these systems appear to enhance mixing of oxidizer and fuel, based on Applicants analysis of the likely operating temperatures of such systems, the location of the cavity downstream from initial mixing of the oxidizer and fuel would result in very high temperatures within the conduit in which the mixing occurs—in some cases, temperatures that are substantially higher than the maximum service temperature of most commercially-available steel. Accordingly, the cavity-actuated mixing configurations of the prior art would not be feasible in many applications.

Accordingly, there is a need for improved combustion systems that provide more complete and/or stable combustion in challenging applications, such as those discussed above, while operating within acceptable temperature limits.

SUMMARY

This Summary is provided to introduce a selection of aspects of the invention in a simplified form that are further described below in the Detailed Description.

Aspect 1—A burner comprising:
  a first annular conduit in fluid flow communication with a supply of an annular gas, the annular gas comprising one of oxygen and a gaseous fuel, the first annular conduit having a first inner wall and a first outer wall;
  a central conduit located within the first annular conduit and being in fluid flow communication with a supply of a central gas, the central gas comprising the other of oxygen and a gaseous fuel, the central conduit having a central outer wall and an outlet plane; and
  a cavity formed in at least one of the central outer wall, the first inner wall, and the first outer wall, the cavity being positioned proximal to and a non-zero distance upstream of the outlet plane of the central conduit, the cavity having a length, a depth, and an aspect ratio defined as the length divided by the depth, the depth being at least 10% of the hydraulic diameter of the conduit bounded by the wall in which the cavity is formed, the aspect ratio being from 1 to 10.

Aspect 2—The burner of Aspect 1, wherein the central gas consists of oxygen and the annular gas consists of the gaseous fuel.

Aspect 3—The burner of any of Aspects 1-2, wherein the central gas consists of the gaseous fuel and the annular gas consists of oxygen.

Aspect 4—The burner of any of Aspects 1-3, wherein the cavity has an aspect ratio of between 1 and 4.

Aspect 5—The burner of any of Aspects 1-4, wherein the cavity has an upstream wall, a bottom wall, and a downstream wall, and wherein the length is a distance between the upstream wall and the downstream wall, and wherein the depth is a height of one of the upstream wall and the downstream wall.

Aspect 6—The burner of any of Aspects 1-5, wherein the cavity is formed in the central outer wall.

Aspect 7—The burner of any of Aspects 1-6, wherein the cavity extends continuously through a 360 degree circumference of the cavity-containing wall.

Aspect 8—The burner of any of Aspects 1-6, wherein the cavity comprises a plurality of cavities spaced along a 360 degree circumference of the cavity-containing wall.

Aspect 9—The burner of any of Aspects 1-8, further comprising a converging nozzle located upstream from and proximal to the cavity.

Aspect 10—The burner of any of Aspects 1-8, further comprising a converging-diverging nozzle located upstream from and proximal to the cavity.

Aspect 11—The burner of any of Aspects 5-10, wherein the cavity upstream wall is perpendicular to a direction of flow in the central conduit and the first annular conduit.

Aspect 12—The burner of any of Aspects 1-10, further comprising a second annular conduit configured to discharge a mixture of solid fuel and a transport gas, the second annular conduit surrounding the first annular conduit.

Aspect 13—A method comprising:
  (a) flowing one of oxygen and gaseous fuel through a central conduit;

(b) flowing the other of oxygen and gaseous fuel through a first annular conduit that surrounds the central conduit; and (c) flowing one of the oxygen and gaseous fuel across a cavity positioned in at least one of the central conduit and the first annular conduit, the cavity being proximal to and a non-zero distance upstream of an outlet plane of the central conduit, the cavity having a length, a depth, and an aspect ratio defined as the length divided by the depth, the depth being at least 10% of the hydraulic diameter of the conduit in which the cavity is positioned, the aspect ratio being from 1 to 10.

Aspect 14—The method of Aspect 13, wherein the cavity has a length, a depth, and an aspect ratio defined as the length divided by the depth, the aspect ratio being between 1 and 4.

Aspect 15—The method of any of Aspects 13-14, wherein the cavity is located in an outer wall of the central conduit.

Aspect 16—The method of any of Aspects 13-15, wherein the cavity extends continuously through a 360 degree circumference of the cavity-containing wall.

Aspect 17—The method of any of Aspects 13-15, wherein the cavity comprises a plurality of cavities spaced along a 360 degree circumference.

Aspect 18—The method of any of Aspects 13-17, further comprising:

(d) flowing one of the oxygen and gaseous fuel through a converging nozzle located upstream from and proximal to the cavity.

Aspect 19—The method of any of Aspects 13-17, further comprising:

(d) flowing one of the oxygen and gaseous fuel through a converging-diverging nozzle located upstream from and proximal to the cavity.

Aspect 20—The method of any of Aspects 13-19, further comprising:

(e) performing steps (a) and (b) in a manner that results in a molar ratio of oxygen to gaseous fuel is in excess of a required stoichiometric molar ratio for complete combustion of the gaseous fuel.

Aspect 21—The method of any of Aspects 13-20, further comprising:

(f) flowing a mixture of solid fuel and a transport gas through a second annular conduit that surrounds the first annular conduit.

Aspect 22—The method of any of Aspects 13-21, wherein the one of oxygen and gaseous fuel is flowed through the central conduit at a central gas velocity of at least about 50 meters per second, and wherein the mixture of solid fuel and transport gas is flowed through the second annular conduit at a solid fuel velocity less than the central gas velocity.

Aspect 23—The method of Aspect 22, wherein the central gas velocity is at least Mach 1.

Aspect 24—A burner comprising:

a central conduit configured to discharge a central gas comprising one of oxygen and a gaseous fuel, the central conduit being bounded by a central outer wall;

a annular conduit configured to discharge an annular gas comprising the other of oxygen and a gaseous fuel, the annular conduit surrounding the central conduit and being bounded by an annular inner wall and an annular outer wall; and a cavity formed in at least one cavity-containing wall selected from the group consisting of the central outer wall, the annular inner wall, and the annular outer wall, the cavity being positioned proximal to and a non-zero distance upstream of an outlet plane of the central conduit, the cavity having a length, a depth, and an aspect ratio defined as the length divided by the depth, the depth being at least 10% of the hydraulic diameter of the conduit bounded by the wall in which the cavity is formed, the aspect ratio being from 1 to 10.

BRIEF DESCRIPTION OF THE DRAWING(S)

Embodiments of the present invention will hereinafter be described in conjunction with the appended drawing figures wherein like numerals denote like elements.

FIG. 6A is a partial schematic left side cross-sectional view of a central conduit portion of a fourth exemplary embodiment of an oxy-gaseous fuel burner having a converging nozzle upstream of a cavity;

FIG. 6B is a partial schematic left side cross-sectional view of a central conduit portion of a fifth exemplary embodiment of an oxy-gaseous fuel burner having a converging-diverging nozzle upstream of a cavity;

FIG. 7 is a partial schematic left side cross-sectional view of the cavity and converging nozzle portion of the burner of FIG. 6A;

FIG. 8 is a schematic front view of a solid fuel burner in accordance with a sixth exemplary embodiment of the present invention;

FIG. 9 is a partial schematic left side cross-sectional view of the burner of FIG. 8;

FIG. 10 is a partial schematic left side cross-sectional view of a seventh exemplary embodiment of a solid fuel burner;

FIG. 11 is a partial schematic left side view of the burner of FIG. 10, showing the entrainment of solid fuel into an oxygen-gaseous fuel flame;

FIG. 12 is a cross-sectional view showing the use of the solid fuel burner shown in FIG. 10 in a shaft furnace;

DETAILED DESCRIPTION OF THE PREFERRED EMBODIMENT(S)

Figure 2A:
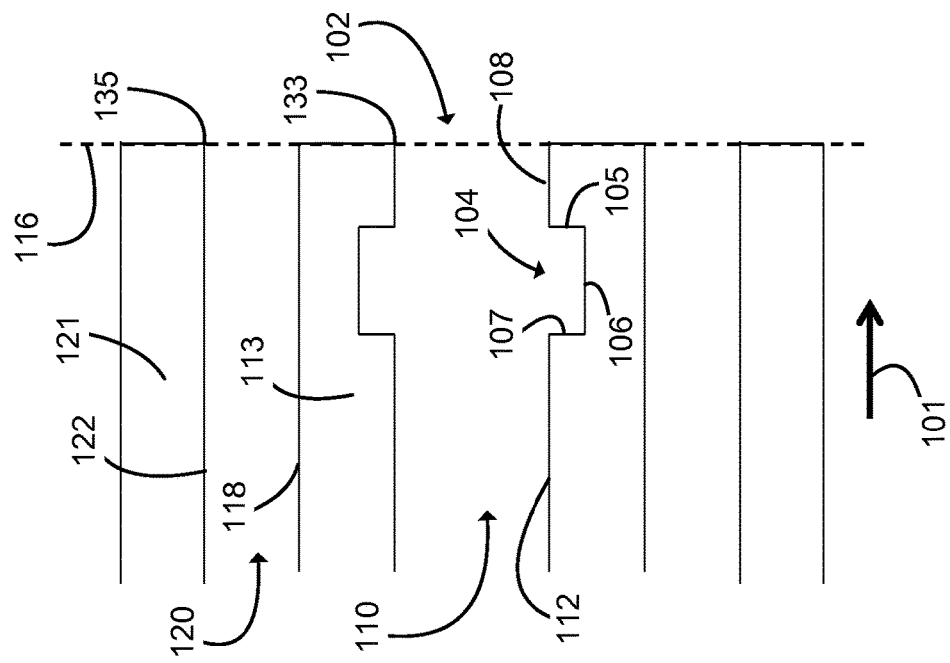
FIG. 2A is a partial schematic left side cross-sectional view of the burner of FIG. 1.

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing the preferred exemplary embodiments of the invention. It being understood that various changes may be made in the function and arrangement of elements without departing from the spirit and scope of the invention.

In order to aid in describing the invention, directional terms may be used in the specification and claims to describe portions of the present invention (e.g., upper, lower, left, right, etc.). These directional terms are merely intended to assist in describing and claiming the invention and are not intended to limit the invention in any way. In addition, reference numerals that are introduced in the specification in association with a drawing figure may be repeated in one or more subsequent figures without additional description in the specification in order to provide context for other features.

In the figures, elements that are similar to those of other embodiments of the present invention are represented by reference numerals increased by a value of 100. For example, the cavity 104 associated with the first exemplary embodiment corresponds to the cavity 204 associated with the second exemplary embodiment. Such elements should be regarded as having the same function and features unless otherwise stated or depicted herein, and the discussion of such elements may therefore not be repeated for multiple embodiments.

The term "conduit," as used in the specification and claims, refers to one or more structures through which fluids can be transported between two or more components of a system. For example, conduits can include pipes, ducts, passageways, and combinations thereof that transport liquids, vapors, and/or gases.

In the claims, letters are used to identify claimed steps (e.g. (a), (b), and (c)). These letters are used to aid in referring to the method steps and are not intended to indicate the order in which claimed steps are performed, unless and only to the extent that such order is specifically recited in the claims.

As used in the specification and claims, the terms "flow communication" and "fluid flow communication" are intended to be synonymous and to mean that two or more elements are connected (either directly or indirectly) in a manner that enables fluids to flow between the elements, including connections that may contain valves, gates, or other devices that may selectively restrict fluid flow.

As used in the specification and claims, the term "oxygen" is intended to mean as a gas containing oxygen molecules at a concentration greater than or equal to 28 mol %, preferably greater than or equal to 60 mol %, and more preferably greater than or equal to 85 mol %.

As used in the specification and claims, the term "solid fuel" is intended to mean a hydrocarbon fuel in solid form. Examples of solid fuels include petroleum coke; all varieties of coal including anthracite, bituminous, sub-bituminous, and lignite; peat, wood, grass, and other so-called biomass materials; municipal solid waste; and combinations thereof.

As used in the specification and claims, the term "gaseous fuel" is intended to mean a gas containing carbon, hydrogen, combinations thereof, and/or any other gaseous constituents that are capable of chemically reacting with an oxidizer and releasing energy. Examples of gaseous fuels include natural gas, propane, acetylene, ethane, synthesis gas, coal oven gas and coke oven gas.

As used in the specification and claims, the term "direction of flow" is intended to mean the general direction of freestream or bulk flow of a fluid through a conduit.

As described in greater detail herein, Applicants have found that strategic placement of a cavity in the wall of the flow passage of one of the reactants can effectively increase the reactant mixing rate to the extent that combustion of the reactants can be stably and completely carried out in high speed flow systems, even when the flow speed of one or both of the reactants is flowing at a speed greater than or equal to the local speed of sound. With respect to the solid fuel combustion problem, the Applicants have developed a burner that utilizes a high speed oxy-gaseous fuel pilot flame to rapidly entrain, ignite and fully combust the solid fuel in a very short time and over a very short distance; for example over times and distances consistent with the requirements of efficient cupola and blast furnace operations.

In addition, Applicants have found a means of achieving high speed solid fuel combustion that overcomes the aforementioned challenges. Specifically, Applicants have found that introducing the solid fuel at moderate velocity (e.g., less than about 100 m/sec) through an annulus outside the envelope of the oxy-gaseous fuel flame provides rapid entrainment of the solid fuel into high speed oxy-gaseous fuel flame, where it is then rapidly heated, ignited and combusted.

Figure 1:
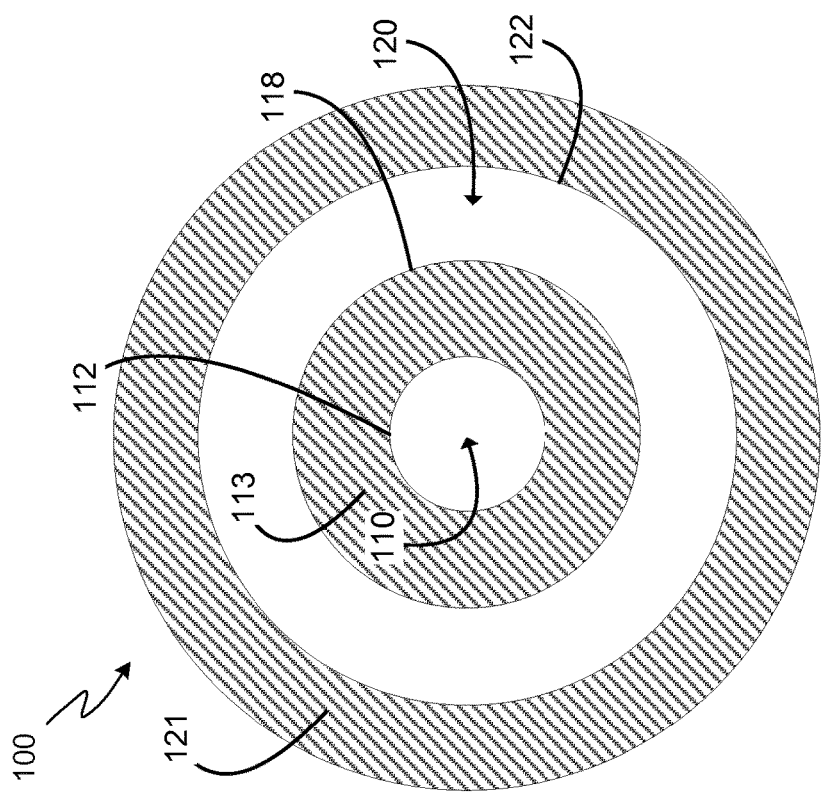
FIG. 1 is a schematic front view of an oxy-gaseous fuel burner in accordance with an exemplary embodiment of the present invention.

Referring to FIGS. 1 and 2A, an exemplary oxy-gaseous fuel burner 100 is shown. The burner 100 includes a central conduit (or plenum) 110 that is surrounded by a first annulus 120. Although in the depicted embodiment the central conduit 110 is nominally circular in cross-section and the first annulus 120 is nominally cylindrical in cross section, it is understood that in other embodiments of the burner 100, one or both of the central conduit 110 and the first annulus 120 may be oblong, oval, rectangular, in the shape of an ovalized rectangle with rounded corners, or other non-circular geometry. The fluid flowing through central conduit 110 may be either a gaseous fuel or oxygen. The fluid flowing through the first annulus 120 fluid is preferable the other of gaseous fuel or oxygen. In other words, if the burner 100 is configured for oxygen to flow through the central conduit 110, then it is preferably configured for gaseous fuel to flow through the first annulus 120, and vice-versa. When the burner 100 is operated, the direction of flow 101 of oxygen and gaseous fuel is as shown in FIG. 2A.

Figure 2C:
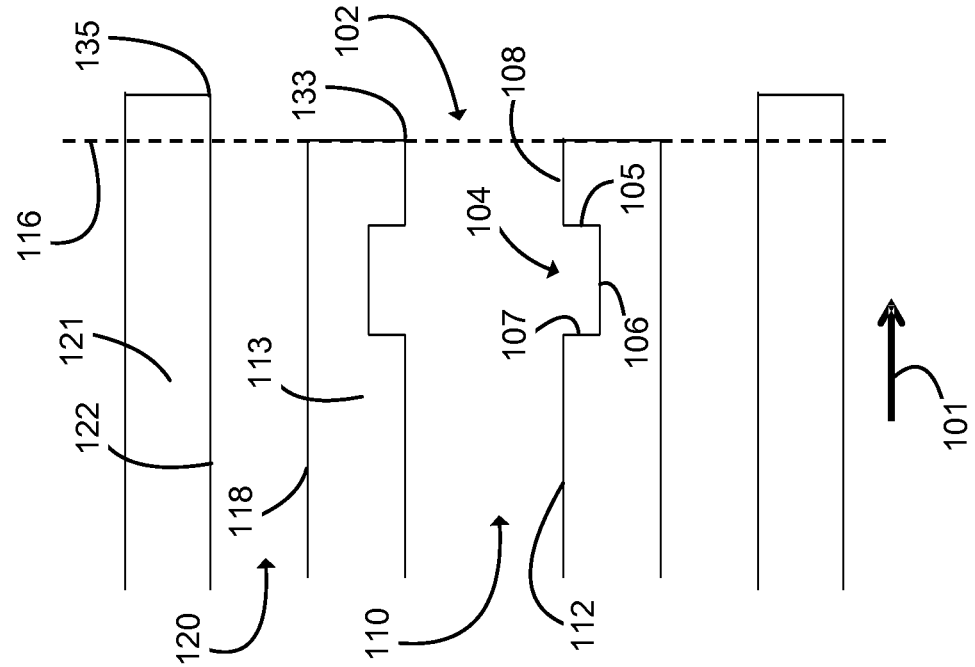
FIG. 2C is a partial schematic left side cross-sectional view of the burner of FIG. 1, showing the downstream end of the first barrier extending beyond the downstream end of the central conduit.
Figure 2B:
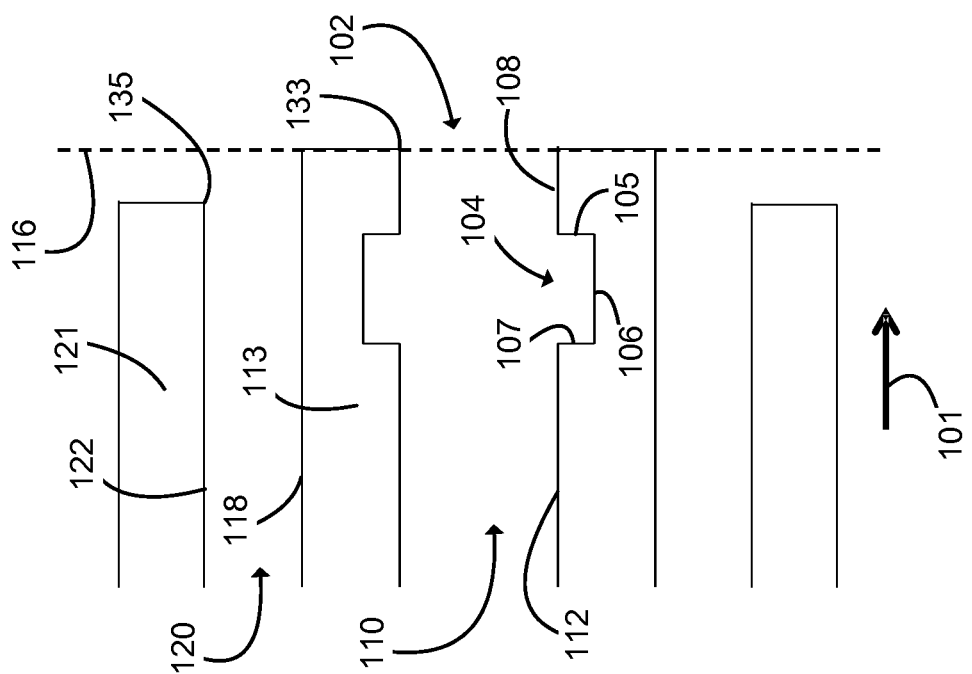
FIG. 2B is a partial schematic left side cross-sectional view of the burner of FIG. 1, showing a downstream end of a central conduit extending beyond a downstream end of a first barrier.

A central barrier 113 forms an outer wall 112 of the central conduit 110 and separates the central conduit 110 from the first annulus 120. The central barrier 113 also forms an inner wall 118 of the first annulus 120. A first barrier 121 forms an outer wall 122 of the first annulus 120. The central barrier includes a downstream end 133 that defines an outlet plane 116 of the central conduit 110. The outlet plane 116 coincides with the point (or location/plane) of initial mixing. No mixing between fluids from the central conduit 110 and the first annulus 120 can take place upstream of the outlet plane 116. The first barrier 121 includes a downstream end 135. In FIG. 2A, the downstream ends 133, 135 of both the central conduit 110 and the first annulus 120 coincide (meaning both are located at the outlet plane 116). FIGS. 2B and 2C, show how the outlet plane 116 remains fixed to the central conduit 119 even when the downstream end 130 of the central conduit 119 is recessed or extended with respect to the downstream end 131 of the annular conduit 120.

In the embodiment of FIG. 2A, the burner 100 also includes a cavity 104 located in a cavity-containing wall, a non-zero distance upstream from and proximal to the outlet plane 116. During operation, the cavity functions to stimulate unstable wave motion in the shear layer that separates the free stream fluid and the fluid contained in the cavity, thereby stimulating enhanced mixing between fuel and oxidant downstream of the outlet plane and enabling stable flame attachment even when the fluid flow velocity is very high, for example transonic, sonic, or even supersonic. This type of stable flame attachment has eluded previous sonic (converging) and supersonic (converging-diverging) nozzle burners because in the absence of a cavity as disclosed herein, the mixing rate between fuel and oxidant is much lower and the flame blows off or extinguishes. In this embodiment, the cavity-containing wall is the outer wall 112 of the central conduit 110. The cavity 104 includes a front or upstream wall 107 (the wall on the upstream end of the cavity 104), a bottom wall 106, and a rear (or downstream) wall 105. In this embodiment, the cavity 104 is rectangular in cross-section and extends around the entire circumference of the outer wall 112 of the central conduit 110. In other words, the cavity 104 is annular and uniform in cross-section. In addition, in this embodiment, the front wall 107 and rear wall 105 are both perpendicular to the direction of flow 101 and the bottom wall 106 is parallel to the direction of flow 101.

Figure 4:
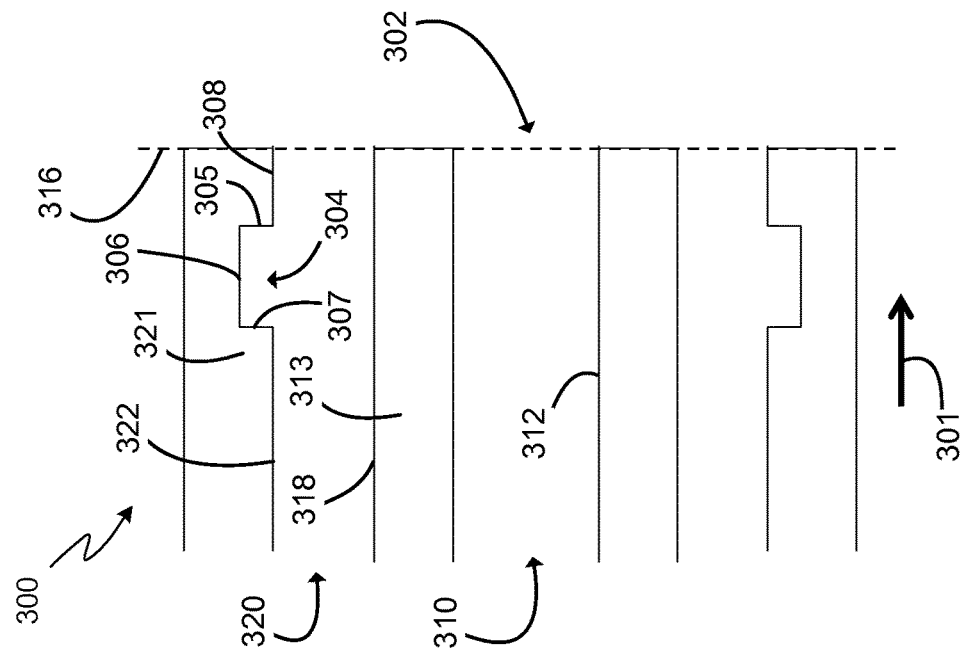
FIG. 4 is a partial schematic left side cross-sectional view of a third exemplary embodiment of an oxy-gaseous fuel burner.
Figure 3:
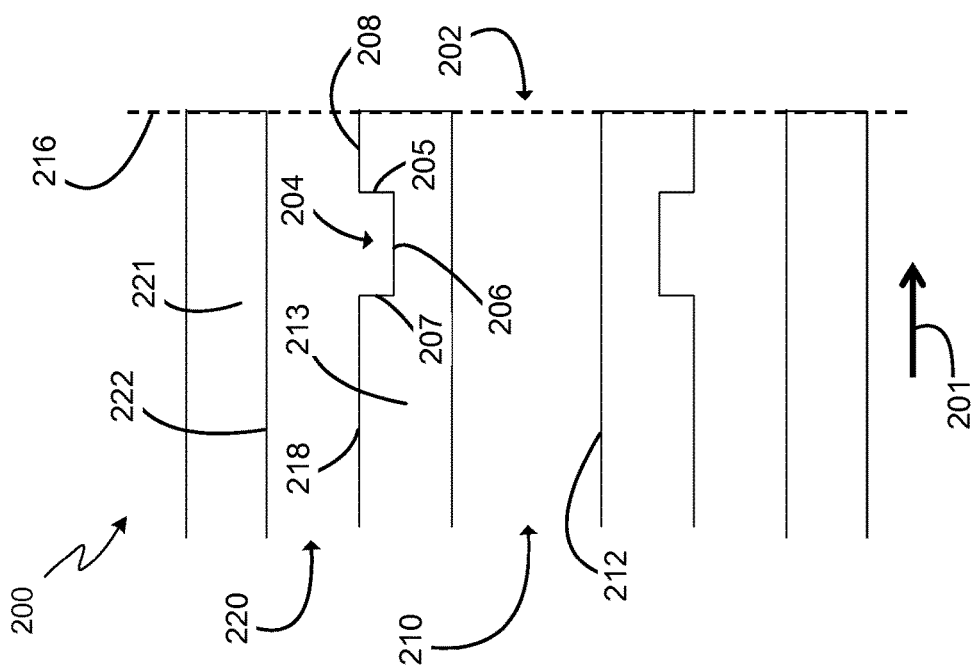
FIG. 3 is a partial schematic left side cross-sectional view of a second exemplary embodiment of an oxy-gaseous fuel burner.
Figure 5E:
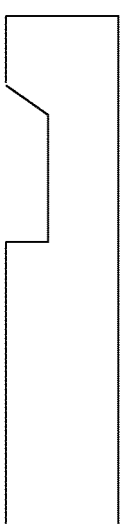
FIGS. 5A through 5H are partial left side cross-sectional views of different cavity shapes that could be provided in alternate embodiments of the burner of FIGS. 1 through 4.
Figure 5F:
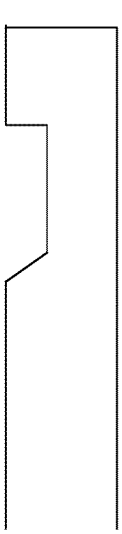
Figure 5G:
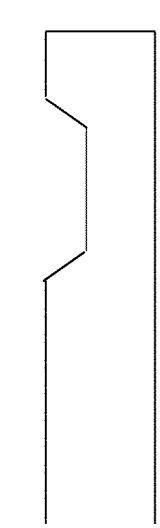
Figure 5H:
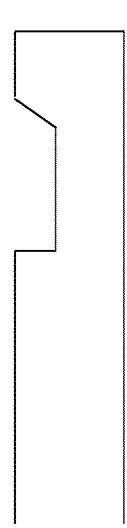
Figure 5A:
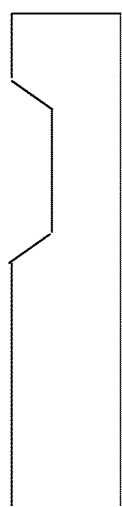
Figure 5B:
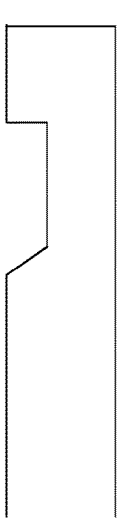
Figure 5C:
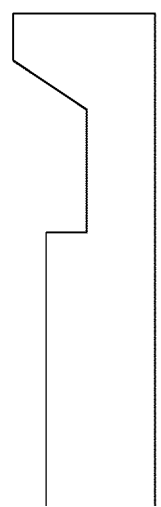
Figure 5D:
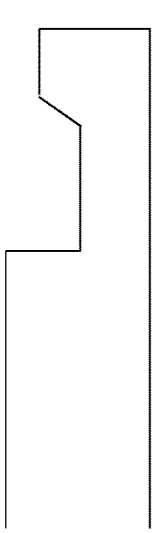

In other embodiments, the cavity 104 could be located in a different cavity-containing wall. For example, FIG. 3 shows an alternate embodiment of the burner 300 in which the cavity 204 is located in the inner wall 218 of the first annulus 220. FIG. 4 shows another alternate embodiment of the burner 300 in which the cavity 304 is located in the outer wall 322 of the first annulus 320.

In other embodiments, the cavity 104 could have different cross-sectional shapes. Examples of alternative cross-sectional shapes are shown in FIGS. 5A through 5H. In further embodiments, the cavity 104 can have a continuous curved shape in which one or more of the front wall 107, the bottom wall 106, and the rear wall 105 indistinguishably blend together, for example to form a semicircular or parabolic cavity. In addition, the cavity 104 could comprise multiple cavities spaced around the circumference of the cavity-containing wall—the outer wall 112 of the central conduit 110 in this embodiment.

Another embodiment of a burner 400 is shown in FIG. 6A. In this embodiment, the cavity 404 is located in the central conduit 410 (as in burner 100) and a converging nozzle 434 having a throat 436 located upstream from and proximal to the cavity 404. Those skilled in the art will recognize that the proper degree of convergence, together with the proper ratio of inlet to outlet pressure, will result in an outlet freestream velocity of Mach 1 at the throat 436 of the nozzle 434, wherein the outlet freestream velocity is equal to the local speed of sound of the freestream gaseous medium. Methods of determining the proper area and pressure ratios to achieve a flow velocity of Mach 1 are known in the art (see, e.g., Owczarek, J. A., *Fundamentals of Gas Dynamics*, International Textbook Company, Scranton, Pa., 1964, which is hereby incorporated by reference).

Yet another embodiment of a burner 500 is shown in FIG. 6B. In this embodiment, the cavity 504 is also located in the central conduit 510 and a converging-diverging nozzle 537 is located upstream from and proximal to the cavity 504. Moving from left to right, the outer wall 512 of the central conduit 510 transitions to a converging portion 538, which gradually decreases in diameter to a throat 539, at which point the converging-diverging nozzle 537 transitions to a diverging portion 540, which gradually increases in diameter until reaching a downstream end 541, which is proximal to the front wall 507 of the cavity 504. Those skilled in the art will recognize that the proper degree of convergence followed by the proper degree of divergence, along with the proper ratio of inlet to outlet pressure, will result in an outlet freestream velocity of greater than Mach 1, wherein the local freestream velocity is greater than the local speed of sound of the freestream gaseous medium.

The shape and location of the cavity is important to its function. An enlarged partial drawing of the burner 400 of FIG. 6A is provided in FIG. 7. As shown in FIG. 7, the cavity includes a depth D and a length L. The depth D of the cavity 404 is defined as the radial distance between the bottom wall 406 and a leading edge 417 of an upper corner 409 of the front wall. The length of the cavity 404 is defined as the average of the linear distance from the upper corner 409 of the front wall 407 to an upper corner 403 of the rear wall 405, and the linear distance from a bottom corner 411 of the front wall 407 to a bottom corner 415 of the rear wall 405.

The aspect ratio of the cavity 404 is the ratio of the length L divided by the depth D. Preferably, the aspect ratio of the cavity 404 is from about 1 to about 10, more preferably from about 1 to about 6 and, most preferably, from about 1 to about 4. The preferred aspect ratio ranges set forth above are applicable to all of the embodiments of the burner discussed herein. Preferably, the ratio of the depth D of the cavity 404 to the hydraulic diameter of the conduit in which the cavity is located, i.e., the conduit which is bounded by the wall in which the cavity is formed, is at least about 0.1. Combined with a preference that the L/D ratio be at least about 1, this means that ratio of the length L of the cavity 404 to the hydraulic diameter of the conduit in which the cavity is located is also at least about 0.1.

If a nozzle is provided, the cavity is preferably located downstream from and proximal to the nozzle, yet upstream from the outlet plane 416 of the central conduit 410. In the embodiment shown in FIGS. 6A and 7, a distance G1 from the converging nozzle 434 to the cavity 404 is defined as the distance from the downstream end 436 of the nozzle 434 (i.e., where the converging nozzle 434 stops converging) to the upper corner 409 of the front wall 407. In the embodiment shown In FIG. 6B, the distance G1 would be from the downstream end 541 of the converging-diverging nozzle 537 to the top corner of the front wall 507 of the cavity 504. While there is no strict limit on the distance G1, it is preferable to minimize G1 to avoid unnecessary frictional energy loss.

Similarly, the cavity 404 is located at a non-zero distance upstream from and preferably proximal to the outlet plane 416. In the embodiment shown in FIGS. 6A and 7, a distance G2 from the cavity 404 to the outlet plane 416 is defined as the shortest linear distance from the upper corner 403 of the rear wall 405 of the cavity 404 to the outlet plane 416. In this context, "proximal" means that the distance G2 is preferably less than or equal to about 10 times the inner hydraulic diameter of the flow passage or conduit containing the cavity. Those skilled in the art will recognize that the hydraulic diameter is calculated as 4 times the cross-sectional area of the flow passage divided by perimeter of the flow passage.

FIGS. 8 and 9 show another exemplary embodiment of a burner 600, which includes three concentric conduits that create three flow passages: a central conduit (nozzle) 610, a first (or inner) annulus 620 surrounding the central conduit 610, and a second (or outer) annulus 630 surrounding the first annulus 620. The central conduit 610 and the first annulus 620 are as described before in analogous structures of previous embodiments. The second annulus 630 is bounded by an outer barrier 631 and has an inner second wall 628 and an outer second wall 632. In this embodiment, which may be advantageously employed for stable combustion of solid fuel, the central conduit 610 discharges one of oxygen and a gaseous fuel, the first annulus 620 discharges the other of oxygen and a gaseous fuel, and the second annulus 630 discharges solid fuel in a transport gas.

The central conduit 610 preferably discharges a gas, either oxygen or a gaseous fuel, at high velocity through its outtake (the outlet plane 616). In this context, "high velocity" means a velocity that is preferably greater than or equal to at least 50 meters per second, more preferably, a velocity in excess of 100 meters per second and most preferably, a velocity in excess of Mach 1. Preferably, the gas flowing through conduit in which the cavity 604 is located (the central conduit 610 in this embodiment) has the highest velocity of all of the conduits 610, 620, 630 of the burner 600.

In one embodiment, the central conduit 610 discharges oxygen and the first annulus 620 discharges gaseous fuel. In another embodiment, the central conduit 610 discharges gaseous fuel and the first annulus 620 discharges oxygen.

The second annulus 630 discharges a transport gas mixture consisting of solid fuel in a transport gas. For ease of reference, the transport gas mixture is sometimes simply referred to a solid fuel, it being understood that for solid fuel to flow as a fluid, it must be as small particles carried by a transport gas. The transport gas can be air, oxygen-enriched air, oxygen, carbon dioxide, nitrogen, or another gas or mixtures of these gases, and functions primary to transport pulverized or particular solid fuel to and through the burner 630. The velocity of the transport gas mixture (i.e., the solid fuel velocity) at the outtake of the second annulus 630 is preferably lower than the velocity of the gas discharging from the central conduit 610, and in one embodiment, is preferably below 50 meters per second. In the depicted embodiment, the transport gas mixture outtake coincides with the outlet plane 616 of the central conduit 610, but the transport gas outtake may be upstream or downstream of the central conduit outlet plane 616 in other embodiments.

It is preferable that the solid fuel be delivered through a conduit, such as the second annulus 630, which does not deliver the oxygen or gaseous fuel. Applicants have found that discharging solid fuel from the first annulus 620 prevents the initial co-mixing and ignition of the oxy-gaseous fuel streams, which is essential for execution of the required sequential steps. Similarly, discharging solid fuel from the center conduit 610 does not enable sufficient entrainment of the solid fuel into the combusting oxy-gas mixture, resulting in a lower degree of solid fuel combustion over the allowable distance. Moreover, because it is assumed that the solid fuel velocity is relatively low, the jet formed from the reactants is relatively weak and not able to effectively penetrate the bed of a shaft furnace.

The relative velocities of gases exiting the central conduit 610, first annulus 620, and second annulus 630 improve the performance of the burner 600. Additional improvements in performance can be realized by including a cavity and a converging or converging-diverging nozzle having a configuration similar to that shown in burners 400, 500, respectively, as described above with reference to FIGS. 6A, 6B, and 7.

FIG. 10 shows an exemplary embodiment of a burner 700 with an annular cavity 704 that is upstream from and proximal to the outlet plane 716, as well as a converging nozzle 734 that is upstream from and proximal to the cavity 704.

During operation, oxygen and a gaseous fuel are introduced into the central conduit 710 and first annulus 720, respectively, as prescribed in connection with burner 100. The oxygen to gaseous fuel ratio is preferably in excess of that required for complete combustion of the gaseous fuel (i.e., fuel-lean, with an amount of oxygen greater than the stoichiometric ratio). The oxygen-gaseous fuel mixture rapidly ignites due to the heat of the surroundings or due to a dedicated ignition source such as a high voltage igniter or a pilot flame, forming a short, relatively high velocity flame 746 with excess oxygen. As shown in FIG. 11, the high velocity of the gas discharging from the central conduit 710 generates a low pressure region (located between the outlet plane 716 and line 717) downstream of the outlet plane 716 in which the lower velocity solid fuel/transport gas stream 742 is entrained with the oxygen-gaseous fuel flame 744. The solid fuel is thus rapidly ignited and combusted in a chemically active, high temperature flame with excess oxygen, thus achieving the desired result.

As with other embodiments, the cavity 704 could alternatively be located on the first inner wall 718 or the first outer wall 722. In the embodiment, however, it is preferable that the cavity 704 not be located in the second inner or outer walls 728, 732 due to the potential for the solid fuel to deposit in or erode the cavity 704.

The burner 700 can be used in a variety of furnace applications. One specific application for which the burner 700 is particularly well-suited is shown in FIG. 12, which shows a burner 800 being used to improve the performance of a shaft furnace 850 (also referred to the art as a cupola furnace). The shaft furnace 850 includes a shaft 852, through which metal is introduced into a hearth 858 which tapers from top to bottom from a large diameter portion 854 to a reduced-diameter portion 856.

Many shaft furnaces, such as those used in metal-forming foundries, utilize carbonaceous solid fuels in their hearths for both heating value and chemical reduction of the metal. Some of these installations have also attempted to inject solid fuels into the process air streams entering the furnace through from air chambers 862 using one or more tuyeres 860. These attempts have met with varying degrees of success, in large part due to the difficulty in achieving rapid ignition of the injected fuels within the air streams during the short airborne residence time that is available, which is typically of order of milliseconds. Placement of a burner 800 (having the same configuration as burner 700) in the tuyere 860, with its flame directed into the hearth 858 mitigates this limitation and provides improved in-flight solid fuel ignition and combustion.

Nozzle Pressure Loss Measurements

Pressure loss measurements were made at Mach Numbers equal to 1.0 and 1.5 in burners 400, 500, shown in FIGS. 6A and 6B, respectively. The aspect ratios of the cavities 404, 504, L/D, were varied from 0 (no cavity) to 10. For safety reasons, compressed air was used as the fluid in both the central conduit 410, 510 and the first annulus 420, 520. Exemplary pressure loss results for the Mach Number 1.0 tests are summarized in FIG. 13, in which flow rate was held constant at three distinct levels; denoted as Flow Rate 1, Flow Rate 2 and Flow Rate 3. Pressure loss measurements were made using a standard pressure gauge.

Figure 13:
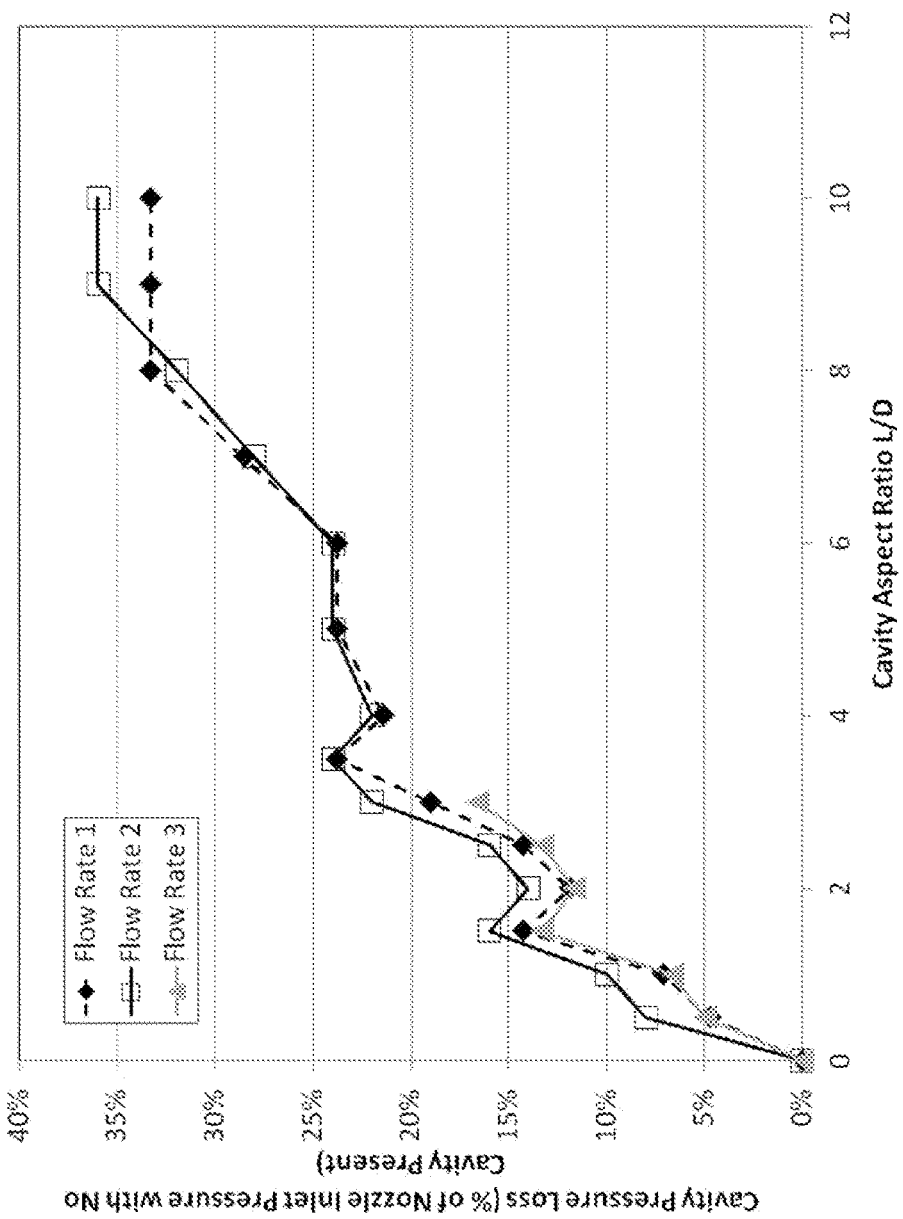
FIG. 13 is a graph of test data showing pressure loss from inlet to outlet at a range of cavity aspect ratios and three different fluid flow rates.

Each flow rate achieved Mach Number equal to 1.0, but with different degrees of under-expansion within the burner 400, 500. That is, in each case, the exit pressure of the burners 400, 500 was higher than ambient pressure, but by a varying amount, yet the velocity at the outlet plane 416, 516 (and, hence flowing past the cavity 404, 504) remained unchanged at Mach 1. For each flow rate, cavity pressure losses (Y axis in FIG. 13) were calculated by subtracting the nozzle inlet pressure for the "no cavity" condition from the nozzle inlet pressure measured with cavities of differing lengths. As shown in FIG. 13, characteristic pressure loss behavior is consistent for the three different flow rates tested. The data follow a repeating trend of increasing cavity pressure loss followed by a plateau of relatively constant pressure loss as cavity aspect ratio increases.

Applicants believe that repeating cycles represent changes in the mode of cavity fluid mechanics and acoustic emission behavior. It is generally understood in the art that the behavior of the cavity is such that for low values of L/D, acoustic disturbances are principally in a direction that is transverse to the free stream flow direction—traveling between the shear interface and the bottom wall of the cavity with relatively low rates of energy dissipation. However, as L/D increases, the acoustic mode begins to shift to one in which longitudinal waves develop (i.e. wave motion in the direction of flow between the front wall and rear wall of the cavity), regular vortices are shed from the leading edge of the cavity and pressure waves are reflected from the cavity rear wall to the cavity front wall. This second stage corresponds to higher acoustic emission and more vigorous fluid dynamic motion in the shear layer. Higher pressure losses would expected due to the more energetic flow-induced wave motion. Further increases in L/D eventually lead to the growth of the vortices and sufficient shear layer oscillation and deflection that the shear layer impinges on the bottom of the cavity. This latter mode results in generation of a highly turbulent flow within the cavity itself (i.e., not just at the shear layer interface and free stream), with yet a further increase in cavity-induced pressure loss. Due to its similarity with wake flows behind bluff bodies, this final mode is sometimes referred to as the "wake" or "wake-like" mode. So, three broad modes of cavity behavior are indentified, and it is plausible that these three would in some way be related to the three repeated cycles of pressure loss increase and plateau with increase in cavity aspect ratio, as apparent from the results shown in FIG. 13.

In order to confirm Applicant's understanding of acoustic emission behavior, acoustic emission spectra were collected in systematic tests for both cold (i.e., non-reacting) flow of compressed air past the cavity and during oxygen-natural gas combustion tests at prescribed conditions. The burners 400, 500 FIGS. 6A and 6B also used for these test at Mach Number 1.0 and 1.5 flow velocities, respectively, attained during cold flow testing. During combustion tests, oxygen was used in the central conduit 410, 510 and natural gas was used in the first annulus 420, 520.

Figure 14:
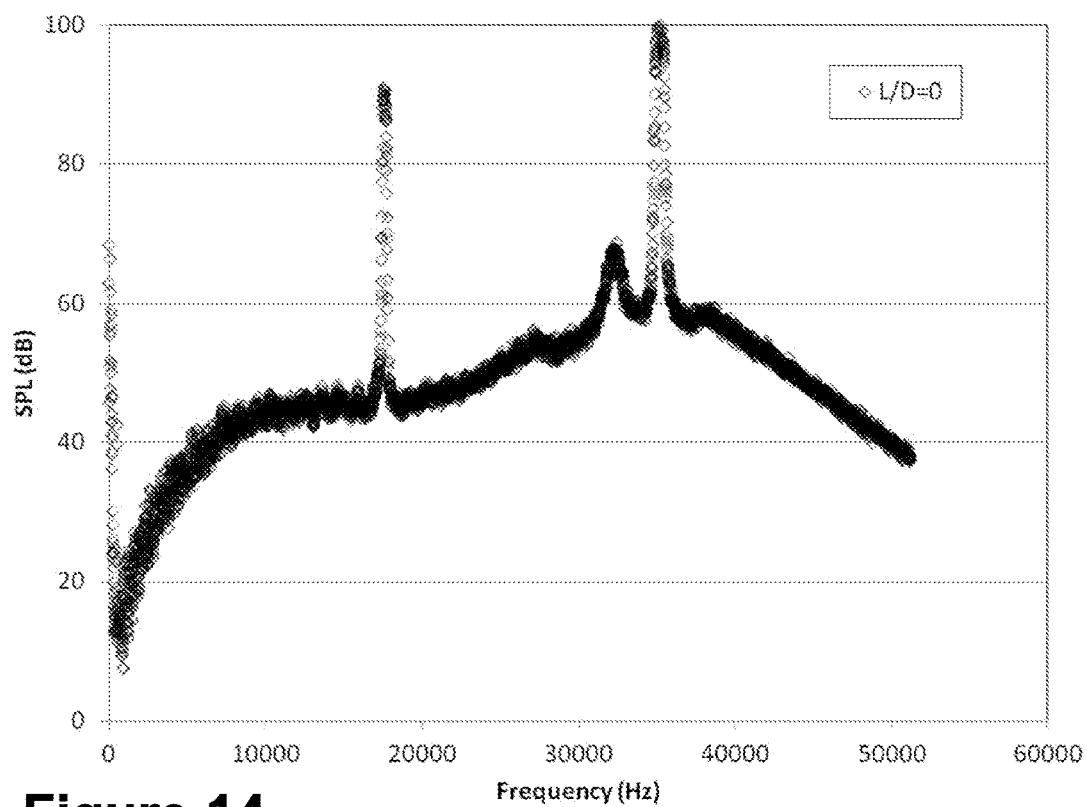
FIGS. 14-22 are graphs of acoustic emissions at a range of frequencies and cavity aspect ratios.

Exemplary results for Mach Number equal to 1.0 are presented in FIGS. 14 through 20, in which sound power level (SPL) in decibels (dB) is plotted versus frequency over the range of aspect ratios (L/D) tested. FIG. 14 shows the SPL versus frequency for cavity aspect ratio L/D equal to 0 (no cavity). The spectrum is largely dominated by broadband emission (i.e. "white noise") interspersed with three distinct narrow band tones resonating at approximately 17.4, 32.1 and 34.8 kHz. In the absence of a cavity, a possible source of these distinct tone emissions is the formation of shock cells downstream of the nozzle exit plane due to the mismatching between the nozzle exit pressure and the ambient pressure occurring during these tests.

Figure 15:
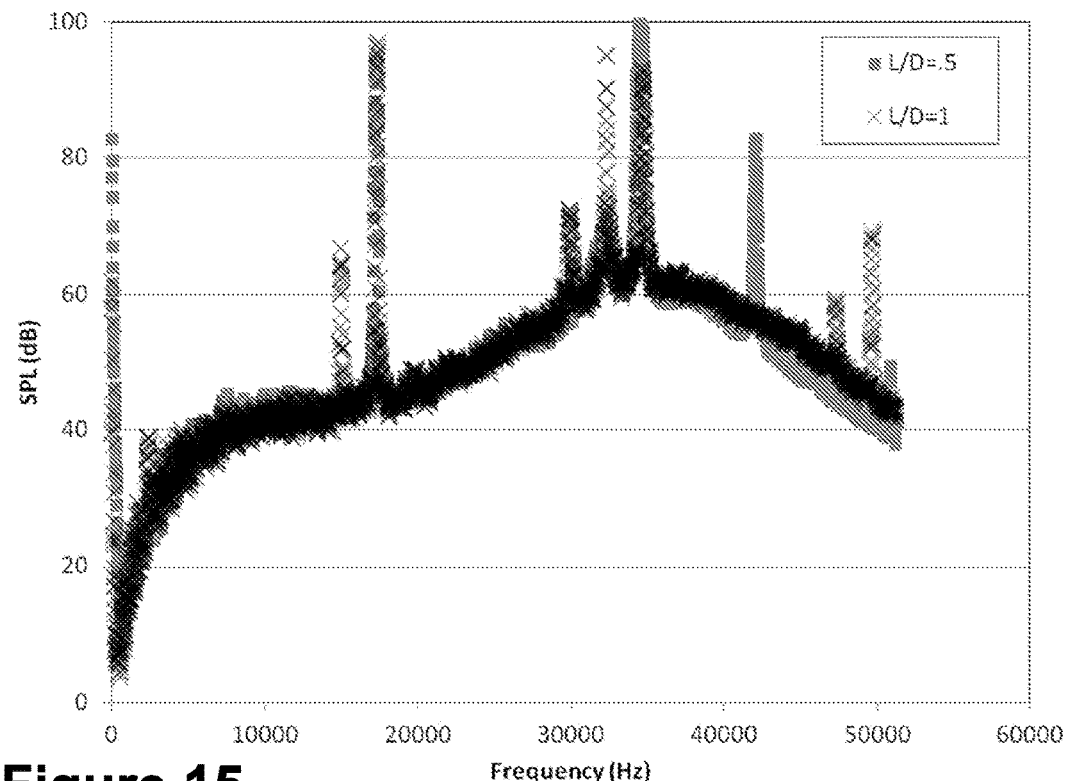

The SPL versus frequency data for L/D=0.5 and 1.0 is presented in FIG. 15. FIG. 15 shows the presence of several additional low energy (i.e., very narrow) discrete tones, which are attributed to cavity disturbances. With respect to the broadband portion of the spectrum, comparison with FIG. 14 reveals that it is largely the same up to a frequency of nominally 35 kHz. Beyond that frequency, however, it is noted that the L/D=1.0 data indicate an increase in broadband noise, suggesting an increase in fine-scale turbulent dissipation, presumably due to the onset of acoustic wave generation.

Figure 16:
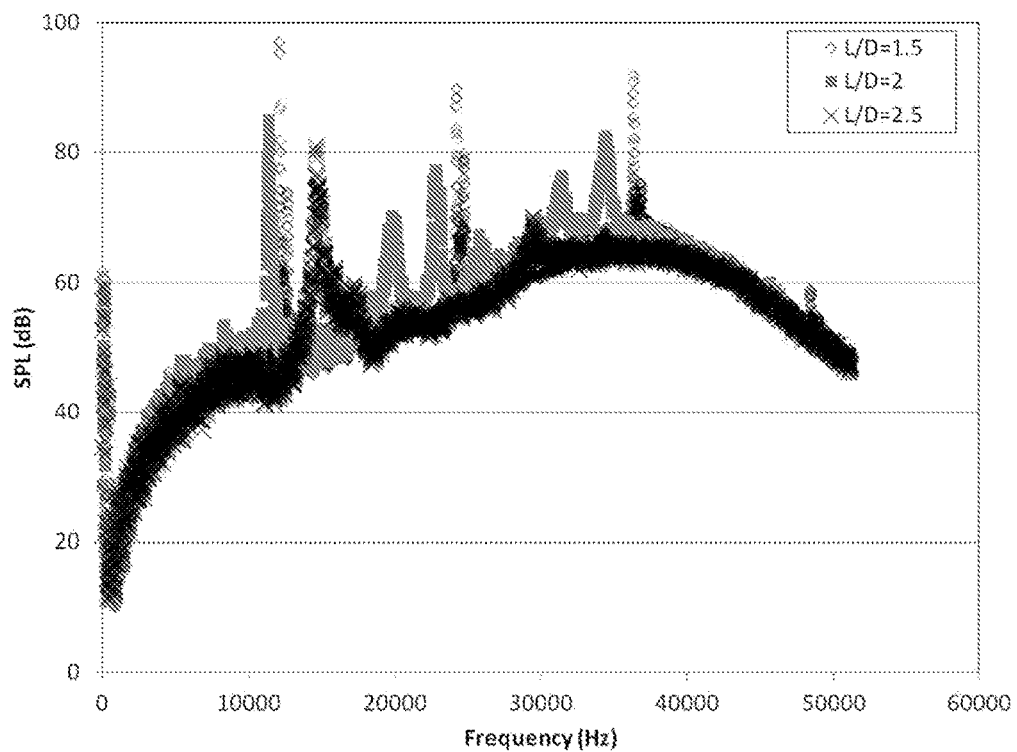

The SPL versus frequency data for L/D=1.5, 2, and 2.5 are presented in FIG. 16. In comparison to FIG. 15, FIG. 16 shows an increase in magnitude of the underlying broadband emission. In addition to this, for L/D=2, numerous additional discrete tones of substantial strength (i.e., as deduced from their increased breadth relative to the sharp, but largely narrow peaks of FIG. 15). This latter feature is suggestive of resonant harmonic modes having been activated for the L/D equal to 2 case.

Figure 17:
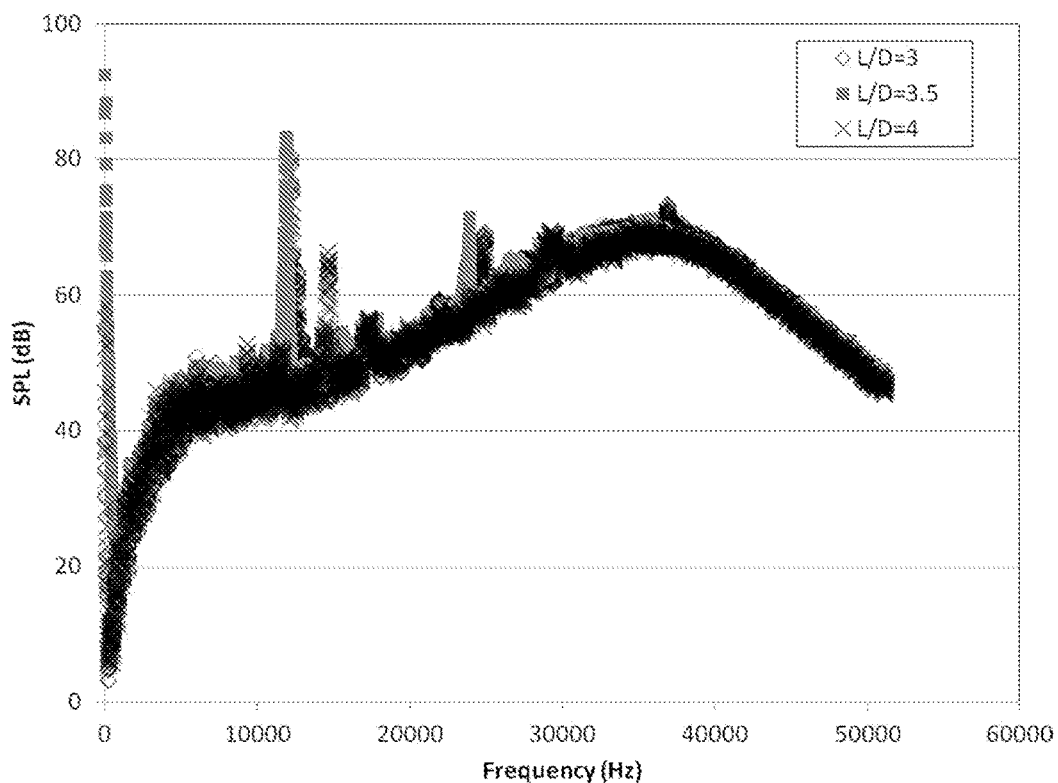
Figure 18:
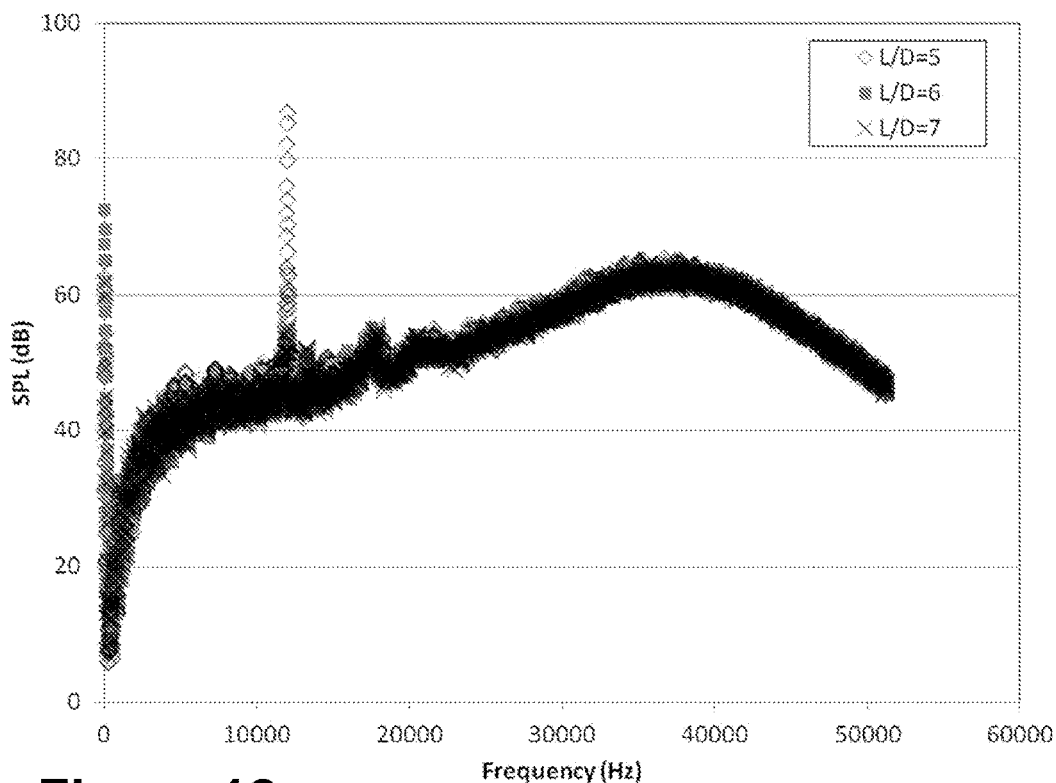
Figure 19:
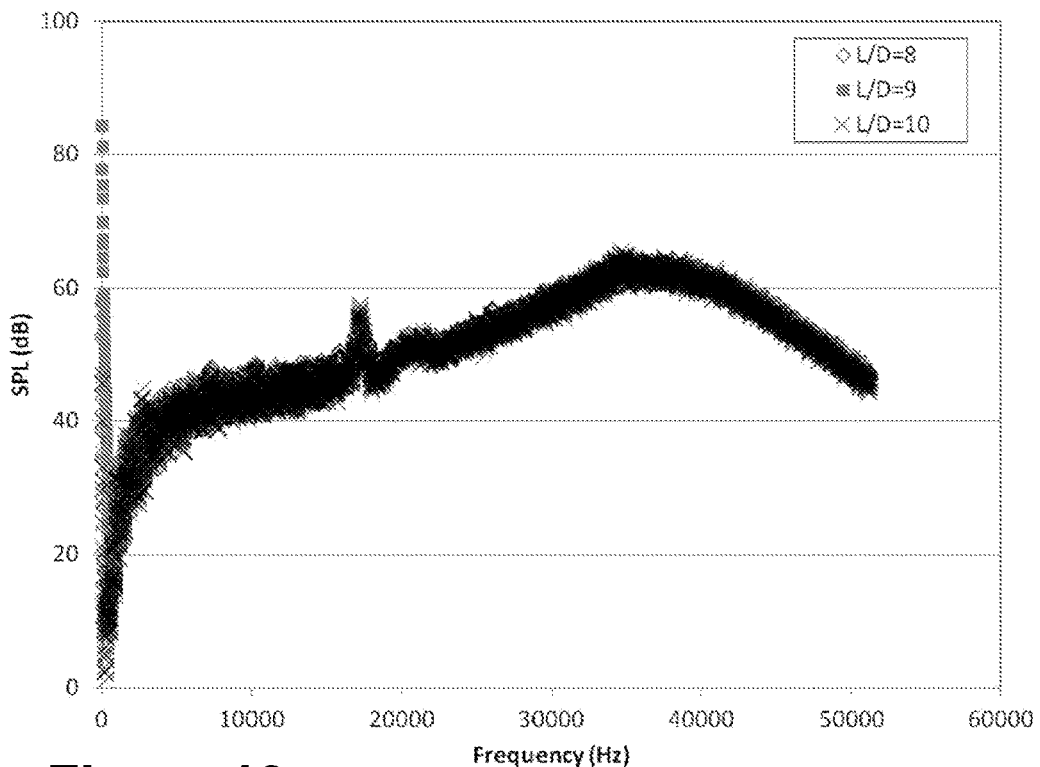
Figure 20:
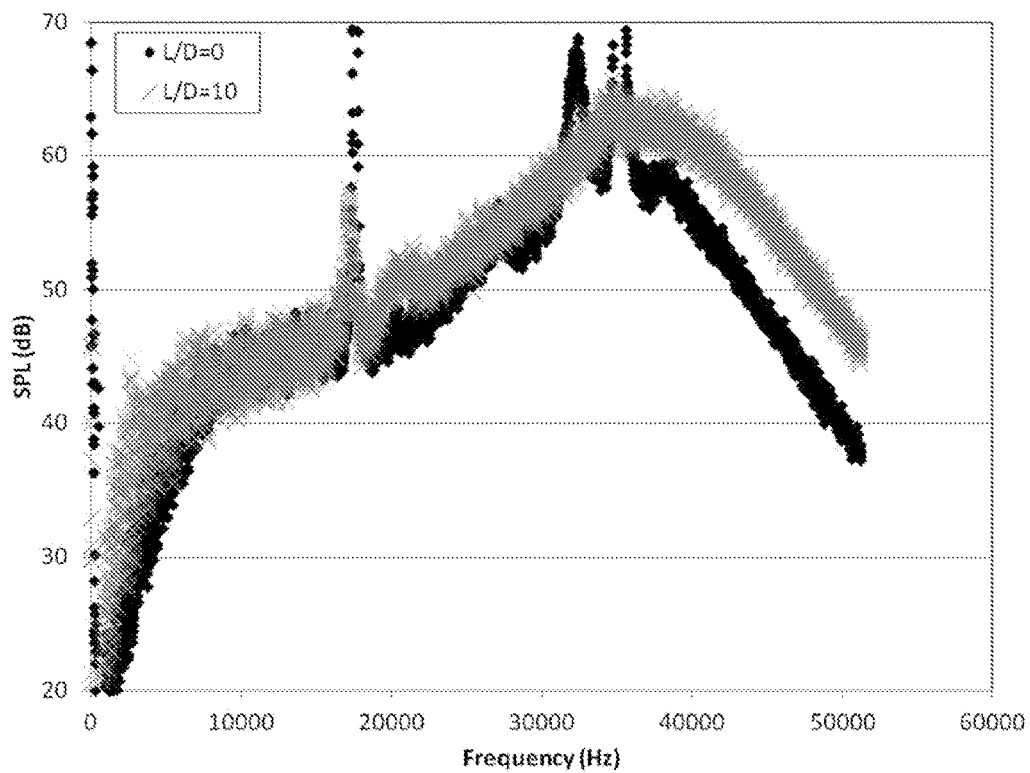

The FIG. 17 SPL versus frequency data for L/D=3, 3.5, and 4 reveal a persistently strong broadband emission, but diminishment of the strength and number of discrete tones. In FIG. 18, which covers L/D equal to 5, 6 and 7, apart from an isolated discrete tone peak at 12 kHz, the signal is essentially just broadband noise with some underlying low amplitude undulations beneath 23 kHz, which may suggest the ongoing emergence and dissipation of multiple discrete frequency emissions. Finally, in FIG. 19, for L/D=8, 9 and 10, apart from a persistent distinct tone at 17 kHz, the behavior is almost fully dominated by broadband noise, denoting the predominance of fine-scale turbulence dissipation. It is instructive in this regard to compare the signals of L/D equal to 0 (no cavity) and L/D equal to 10 in an exploded view as provided in FIG. 20. What is observed is that the nominal 17 kHz tone is present in both cases, but its peak has been damped for L/D=10, presumably due to higher rates of turbulent dissipation. Moreover, the overall magnitude of the broadband emission is markedly higher for the L/D=10 case, particularly within the higher frequency range of the graph, which is to be expected with the increased dissipation and pressure loss associated with this case.

Figure 21:
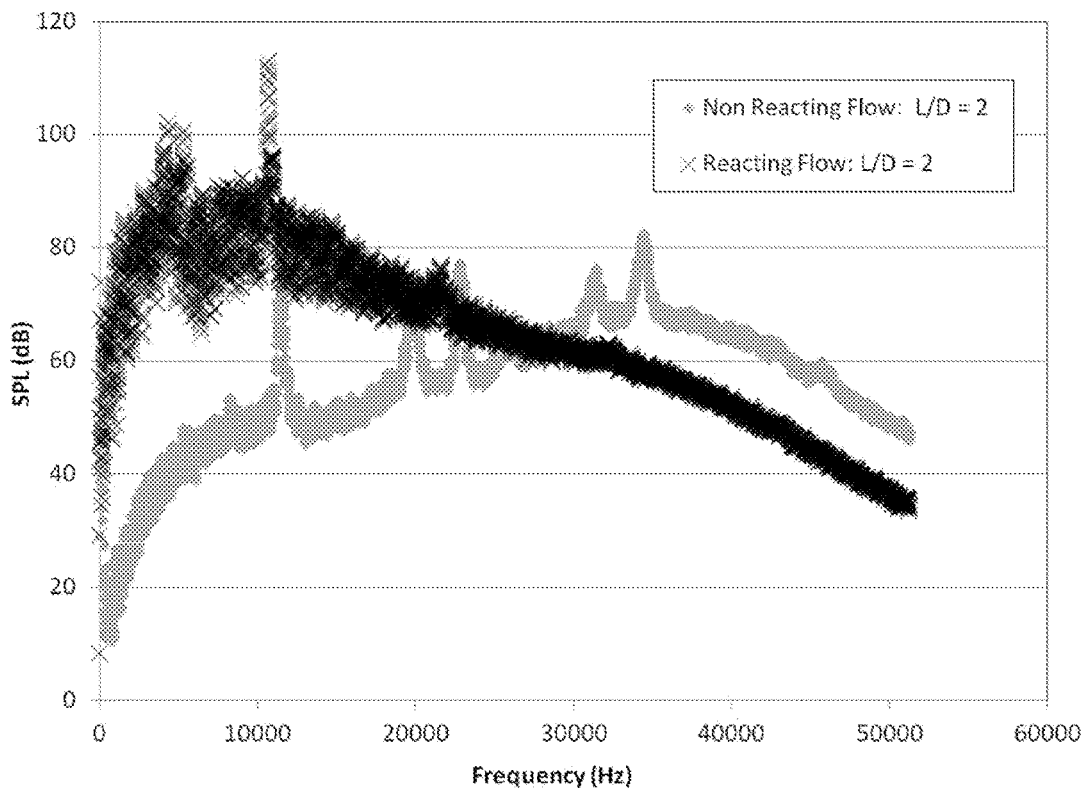

Acoustic spectral emissions were measured for these same burners 400, 500 during combustion testing with oxygen and natural gas (oxygen flowing past the cavity in the inner plenum) and compared with non-reacting flow test data at specified conditions. These are summarized in the spectral plots of FIGS. 21 and 22, for L/D equal to 2 and L/D equal to 5, respectively, which are representative of the two classes of combustion-driven acoustic emissions encountered. That is, one class of combustion emission was observed for cavity/nozzle combinations that produced strong tonal peaks, while another was observed for those producing weak tonal peaks. FIG. 21, for L/D of 2, shows how the combustion spectrum peaks at about 4 kHz, and essentially diminishes thereafter, apart from apparent breakthrough tones at about 5.3, 10.8 and 21.6 kHz. The two latter peaks are very close to the non-reacting peaks at 11.2 and 22.6 kHz. When the non-reacting flow data are corrected for speed of sound differences between air and oxygen (i.e. due to difference in molecular weight), these peaks line up almost identically for the cold and reacting flow cases.

Figure 22:
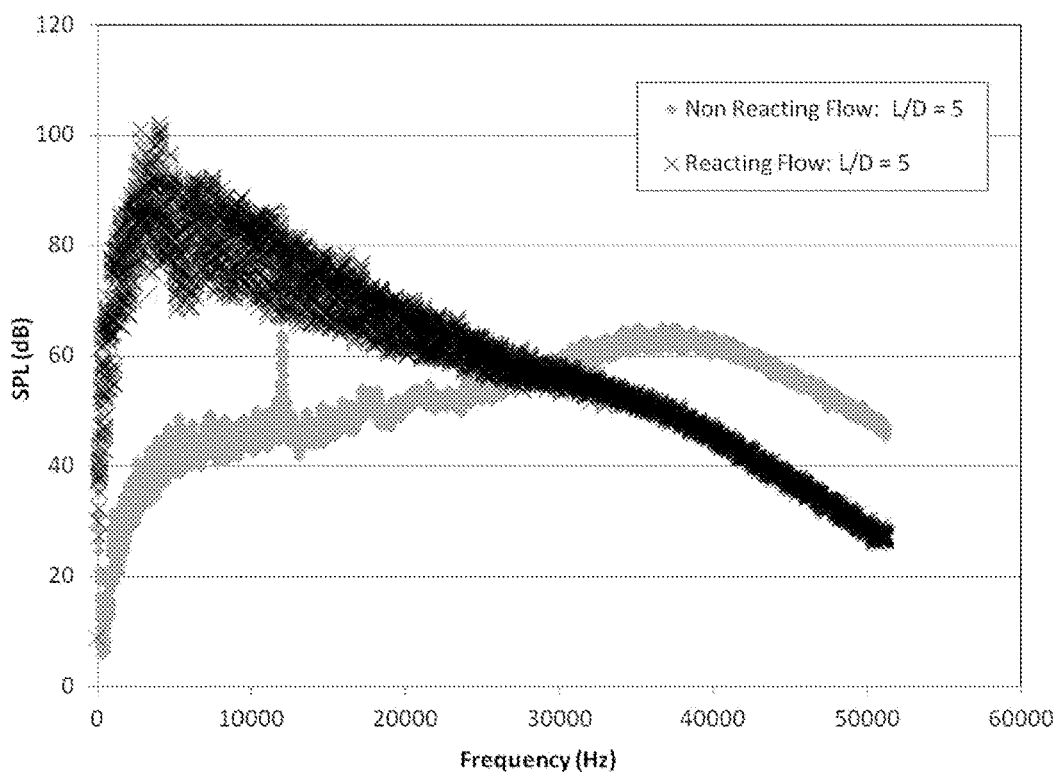

It is further noted that there are no combustion emission peaks associated with the higher frequency cold flow discrete tone emissions; for example those nominally at 31 and 34 kHz. This suggests that the combustion reactions acted as a type of low pass filter, admitting the distinct tones of sufficient strength below about 27 kHz but dampening acoustic emissions at higher frequencies. FIG. 22, for L/D of 5, is illustrative of the other class of emissions. In this graph, while the combustion spectrum again peaks at around 4 kHz, and dampens emissions below about 27 kHz, there are no "breakthrough" cold flow tones, even though there is an obvious cold flow discrete tone emission at 11.9 kHz. This tone, however, apparently lacks the necessary strength to influence the combustion acoustic signature.

Flame Stability Measurements

Figure 23:
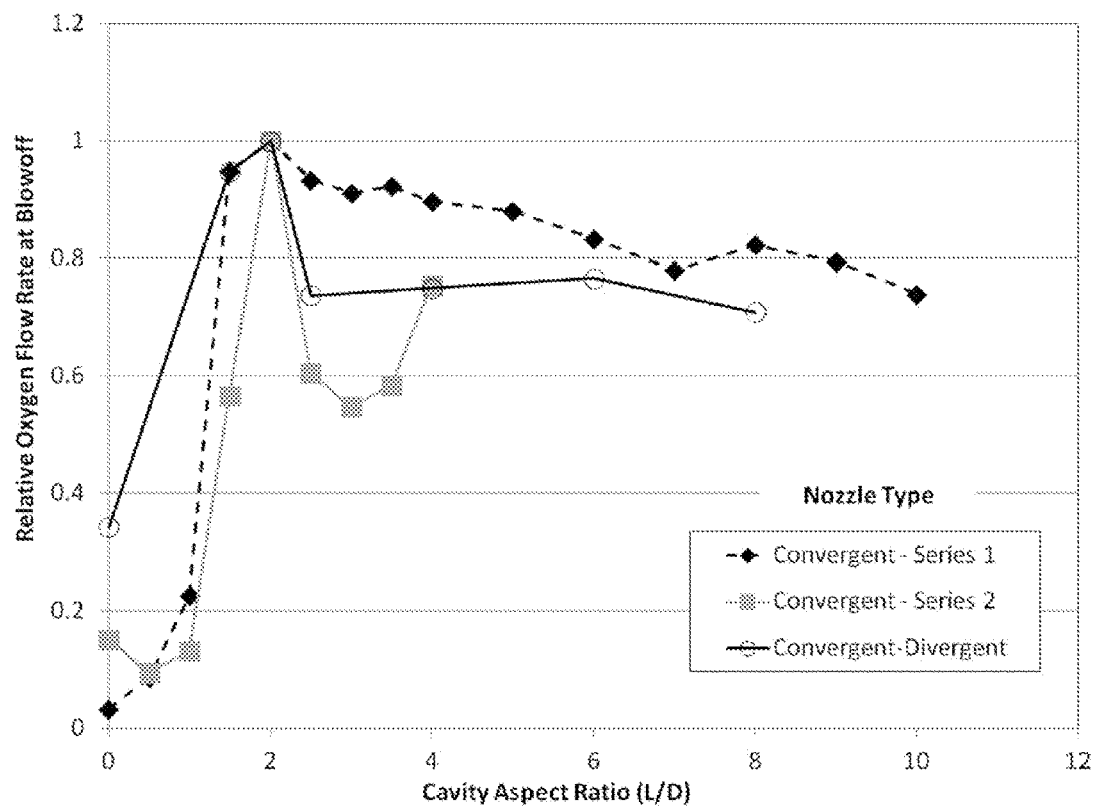
FIG. 23 is a graph showing relative oxygen flow rate at blowoff for a range of cavity aspect ratios.

It is known in the art that high velocity diffusion flames are inherently difficult to stabilize, and for a given fuel/oxidizer combination, stability is strongly influenced by fuel and oxidizer mixing patterns in the region just downstream of the outlet plane. Flame stability was judged herein, by the ability of the flame to resist extinction. Systematic flame stability tests were conducted using the burners 400, 500 of FIGS. 6A and 6B and fluids as for the combustion-acoustic emission tests (i.e., those for which the data are presented in FIGS. 21 and 22). Tests were conducted by initially igniting the burner with a pilot flame, then gradually increasing the oxidant flow until the point of extinction was reached. Results are summarized in FIG. 23 which shows relative oxygen flow rate versus cavity aspect ratio for three different test sets using nozzles with a converging tip and a converging-diverging tip. A sensitive microphone and signal processor were used to measure far-field acoustic spectral emissions.

Several features stand out in this figure. First, there is a dramatic increase in the stability "limit" (i.e. oxygen flow rate at which blowoff occurred) between the "no cavity" condition and the point of peak stability, which suggests that cavity-actuated disturbances of the shear layer measurably improved flame stability. Secondly, the peak in flame stability for all test series occurred at an aspect ratio of 2.0. Finally, the decrease in flame stability for larger aspect ratio cavities takes place rather gradually in comparison to the steep increase between the no-cavity and peak stability blowoff limits.

Based on Applicant's knowledge of underlying processes, it was inferred from test data that i) the acoustic emissions do indeed undergo characteristic modal shifts that depend largely on cavity aspect ratio, and these shifts reflect basic changes in the interaction between the freestream fluid and the fluid contained in the cavity; ii) it is possible to substantially control these interactions to improve stability of high speed oxy/gas diffusion flames; and iii) a stable high speed oxy/gas diffusion flame provides an efficient means of rapidly accelerating, igniting, and combusting a solid fuel without the problems and limitations previously experienced with prior art devices.

Data strongly suggest that the initiation of transition from a transverse wave mode to a longitudinal mode signals the beginning of improved combustion flame stability, and this occurs for aspect ratios L/D larger than 1. Upon further increase in aspect ratio, the wave behavior becomes dominated by longitudinal waves, and eventually transitions to a wake-like mode wherein the shear layer impinges upon the cavity floor and cavity flow becomes highly turbulent. All of these subsequent modal shifts (i.e., after the initial one from transverse to longitudinal wave dominance) maintain some improved flame stability relative to the L/D≤1 case (including no cavity, L/D=0).

There is in fact reason to expect that aspect ratios L/D>10 would continue to provide this enhancement in flame stability. However, for L/D>10, no further systematic shift would be expected in acoustic mode. Yet, the cavity pressure loss would be expected to continue increase owing to the increased cavity length. Hence, there would appear to be no benefit in extending the range of the aspect ratio for the inventive burner significantly above L/D=10. Moreover, since the enhanced flame stability can be attained prior to the modal shift to the wake-like mode (L/D>6) and with somewhat lower cavity pressure loss, a preferred range of cavity aspect ratio is 1<L/D≤6). Finally, since the optimal flame stability occurs in the early phases of modal shift between transverse and longitudinal wave dominance with even lower cavity pressure loss, a highly preferred range of aspect ratio is 1<L/D≤4).

As such, an invention has been disclosed in terms of preferred embodiments and alternate embodiments thereof. Of course, various changes, modifications, and alterations from the teachings of the present invention may be contemplated by those skilled in the art without departing from the intended spirit and scope thereof. It is intended that the present invention only be limited by the terms of the appended claims.

What is claimed is:

1. A burner comprising:
    a first annular conduit in fluid flow communication with a supply of an annular gas, the annular gas comprising one of oxygen and a gaseous fuel, the first annular conduit having a first inner wall and a first outer wall;
    a central conduit located within the first annular conduit and being in fluid flow communication with a supply of a central gas, the central gas comprising the other of oxygen and a gaseous fuel, the central conduit having a central outer wall and an outlet plane; and
    a symmetric cavity formed in at least one of the central outer wall, the first inner wall, and the first outer wall, the cavity being positioned proximal to and a non-zero distance upstream of the outlet plane of the central conduit, the cavity having a length, a depth, and an aspect ratio defined as the length divided by the depth, the depth being at least 10% of the hydraulic diameter of the conduit bounded by the wall in which the cavity is formed, the aspect ratio being from 1 to 10;
    wherein the cavity has an upstream wall, a bottom wall, and a downstream wall, and wherein the upstream wall and the downstream wall each adjoin the bottom wall at the same relative angle to render the cavity symmetric in the upstream-downstream direction, and wherein the length is a distance between the upstream wall and the downstream wall, and wherein the depth is a height of one of the upstream wall and the downstream wall; and
    wherein the cavity is formed in the central outer wall.

2. The burner of claim 1, wherein the central gas consists of oxygen and the annular gas consists of the gaseous fuel.

3. The burner of claim 1, wherein the central gas consists of the gaseous fuel and the annular gas consists of oxygen.

4. The burner of claim 1, wherein the cavity has an aspect ratio of between 1 and 4.

5. The burner of claim 1, wherein the cavity is formed in the central outer wall.

6. The burner of claim 1, wherein the cavity extends continuously through a 360 degree circumference of the cavity-containing wall.

7. The burner of claim 1, wherein the cavity comprises a plurality of cavities spaced along a 360 degree circumference of the cavity-containing wall.

8. The burner of claim 1, further comprising a converging nozzle located upstream from and proximal to the cavity.

9. The burner of claim 1, further comprising a converging-diverging nozzle located upstream from and proximal to the cavity.

10. The burner of claim 1, wherein the cavity upstream wall and the cavity downstream wall are each perpendicular to a direction of flow in the central conduit and the first annular conduit.

11. The burner of claim 1, further comprising a second annular conduit configured to discharge a mixture of solid fuel and a transport gas, the second annular conduit surrounding the first annular conduit.

12. A method of combusting gas using the burner of claim 1, comprising:
(a) flowing one of oxygen and gaseous fuel through the central conduit;
(b) flowing the other of oxygen and gaseous fuel through the first annular conduit that surrounds the central conduit; and
(c) flowing one of the oxygen and gaseous fuel across the cavity.

13. The method of claim 12, the aspect ratio being between 1 and 4.

14. The method of claim 12, wherein the cavity is located in an outer wall of the central conduit.

15. The method of claim 12, wherein the cavity extends continuously through a 360 degree circumference of the cavity-containing wall.

16. The method of claim 12, further comprising:
(d) flowing one of the oxygen and gaseous fuel through a converging nozzle located upstream from and proximal to the cavity.

17. The method of claim 12, further comprising:
(d) flowing one of the oxygen and gaseous fuel through a converging-diverging nozzle located upstream from and proximal to the cavity.

18. The method of claim 12, further comprising:
(d) flowing a mixture of solid fuel and a transport gas through a second annular conduit that surrounds the first annular conduit.

19. A burner comprising:
a central conduit configured to discharge a central gas comprising one of oxygen and a gaseous fuel, the central conduit being bounded by a central outer wall;
an annular conduit configured to discharge an annular gas comprising the other of oxygen and a gaseous fuel, the annular conduit surrounding the central conduit and being bounded by an annular inner wall and an annular outer wall; and
a symmetric cavity formed in at least one cavity-containing wall selected from the group consisting of the central outer wall, the annular inner wall, and the annular outer wall, the cavity being positioned proximal to and a non-zero distance upstream of an outlet plane of the central conduit, the cavity having a length, a depth, and an aspect ratio defined as the length divided by the depth, the depth being at least 10% of the hydraulic diameter of the conduit bounded by the wall in which the cavity is formed, the aspect ratio being from 1 to 10;
wherein the cavity has an upstream wall, a bottom wall, and a downstream wall, and wherein the upstream wall and the downstream wall each adjoin the bottom wall at the same relative angle to render the cavity symmetric in the upstream-downstream direction, and wherein the length is a distance between the upstream wall and the downstream wall, and wherein the depth is a height of one of the upstream wall and the downstream wall; and
wherein the cavity is formed in the central outer wall.

* * * * *